No. 821,061. PATENTED MAY 22, 1906.
A. F. RIETZEL & G. E. BARSTOW.
AUTOMATIC ELECTRIC METAL WORKING MACHINE.
APPLICATION FILED DEC. 5, 1904.
8 SHEETS—SHEET 3.
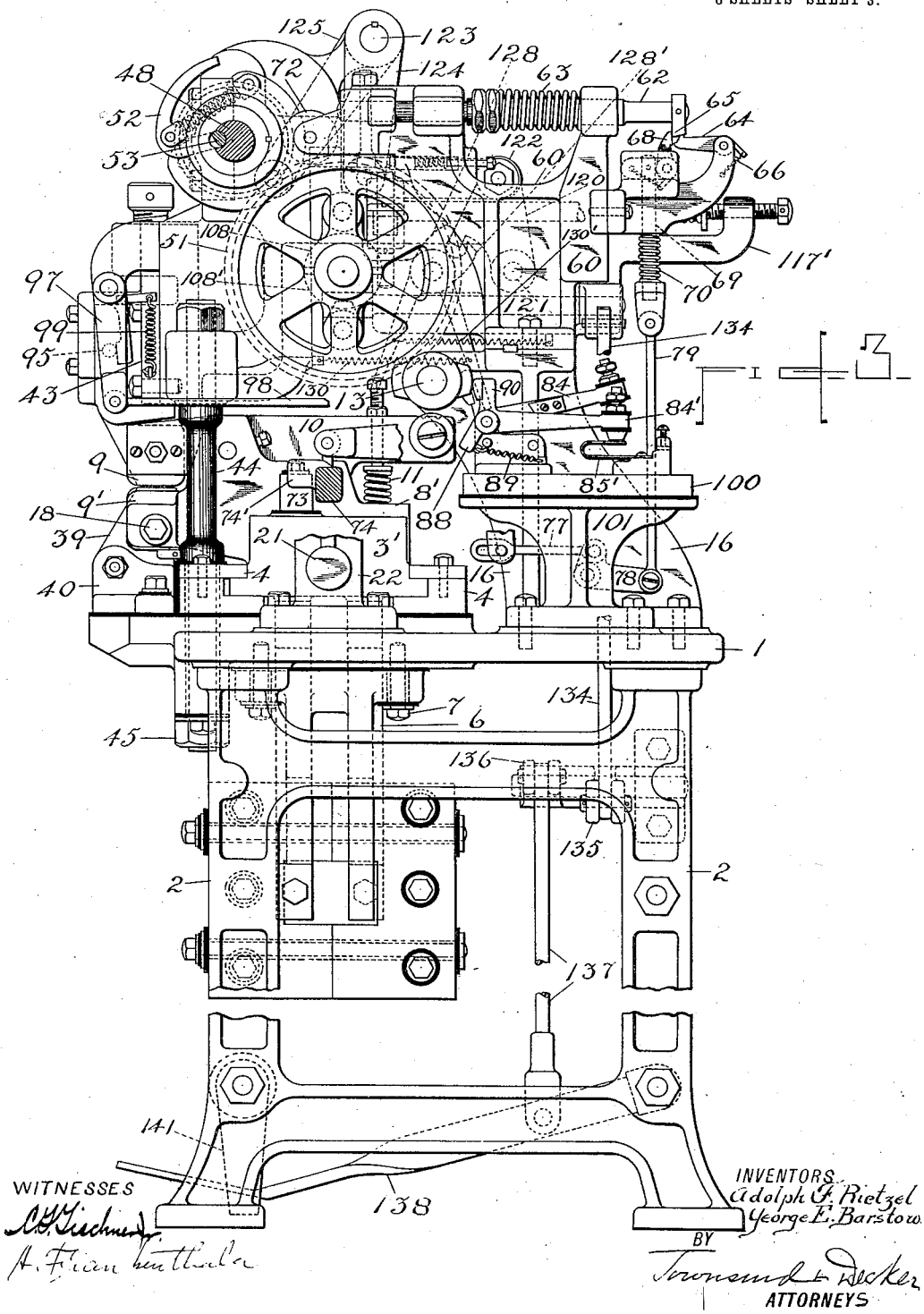
WITNESSES
INVENTORS
Adolph F. Rietzel
George E. Barstow
BY
Townsend & Decker
ATTORNEYS No. 821,061. PATENTED MAY 22, 1906.
A. F. RIETZEL & G. E. BARSTOW.
AUTOMATIC ELECTRIC METAL WORKING MACHINE.
APPLICATION FILED DEC. 5, 1904.
8 SHEETS—SHEET 4.
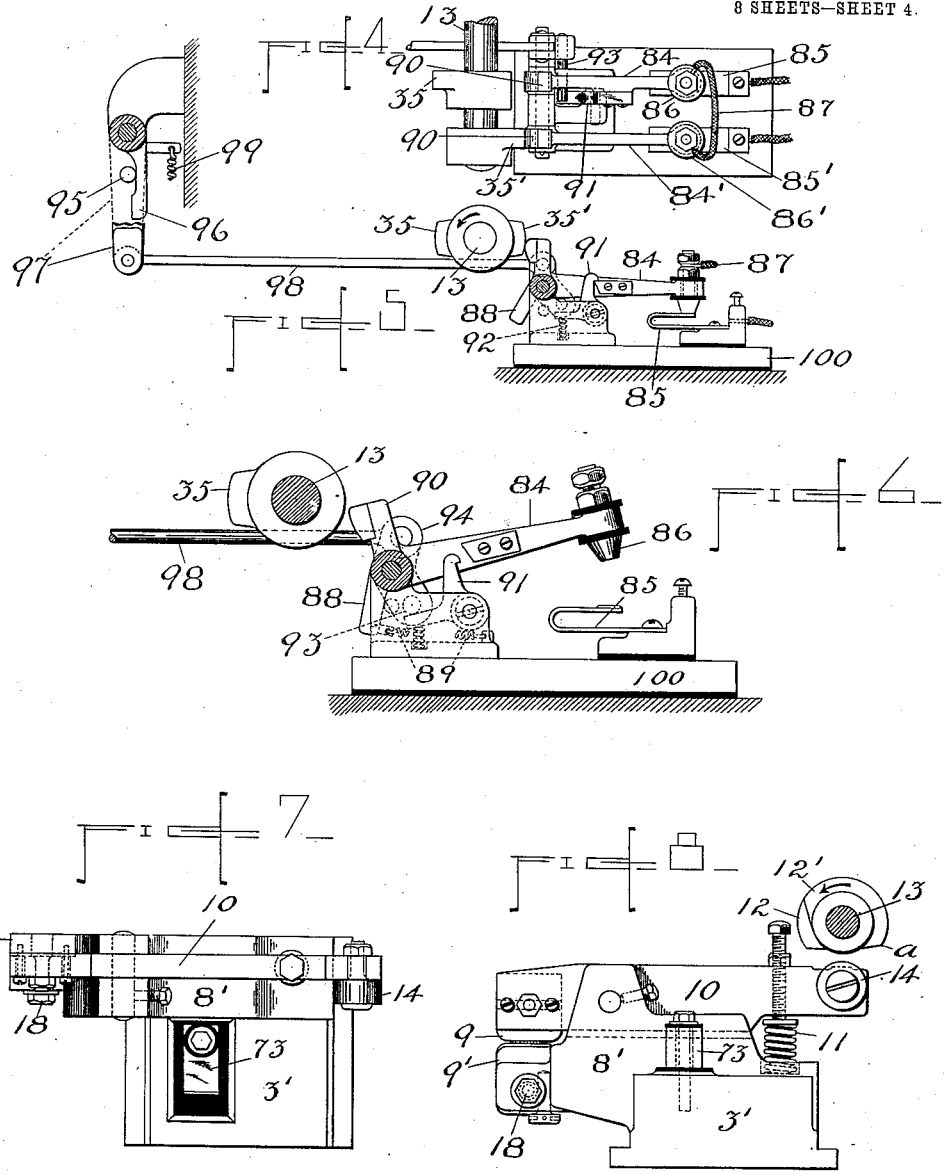
WITNESSES:
INVENTORS
Adolph F. Rietzel
George E. Barstow.
BY
Townsend & Decker
ATTORNEYS

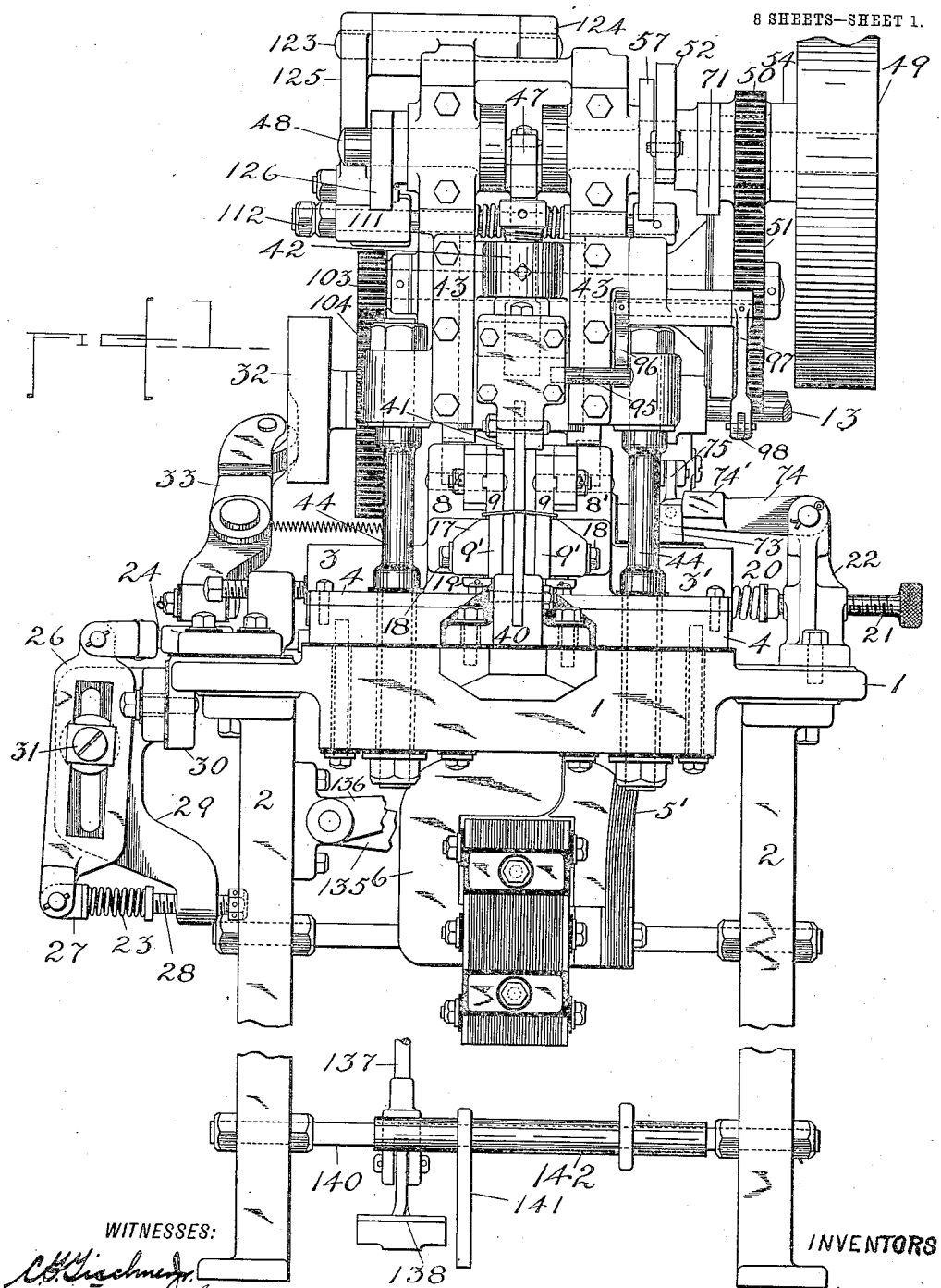

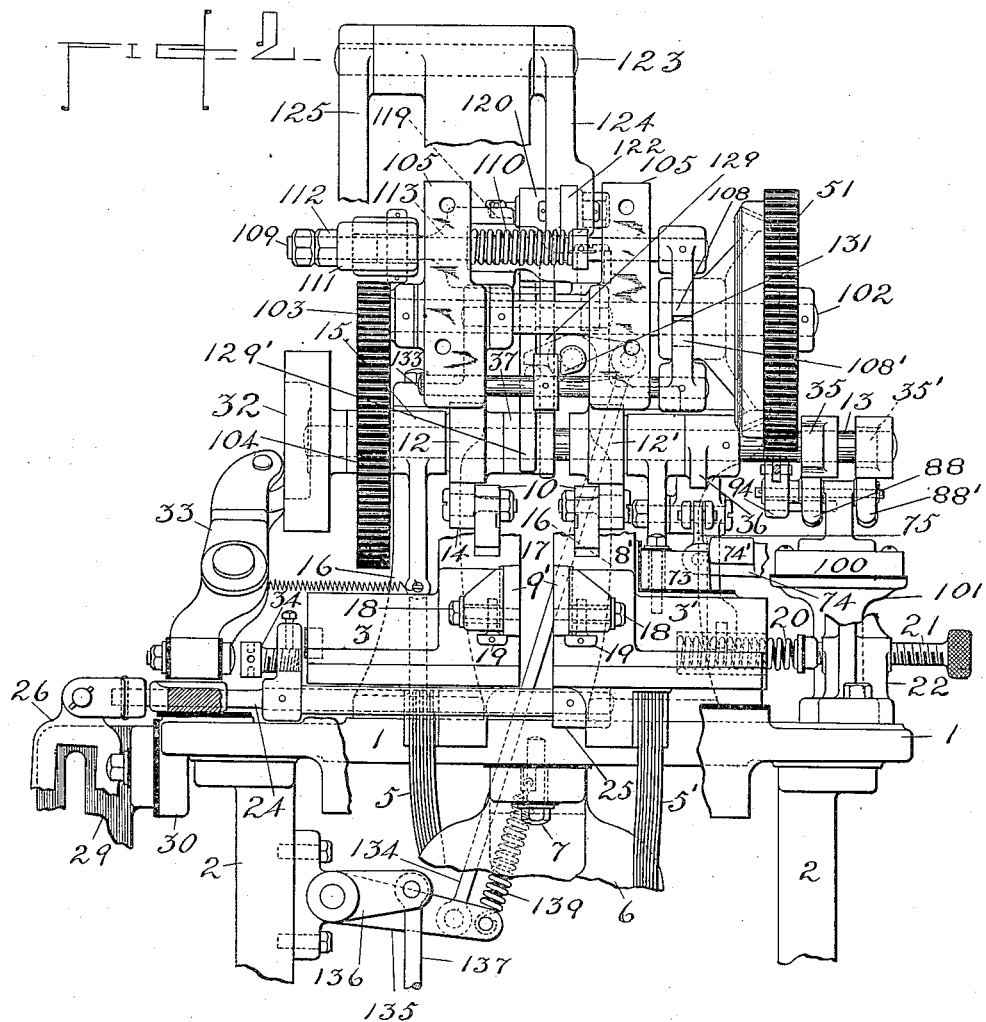

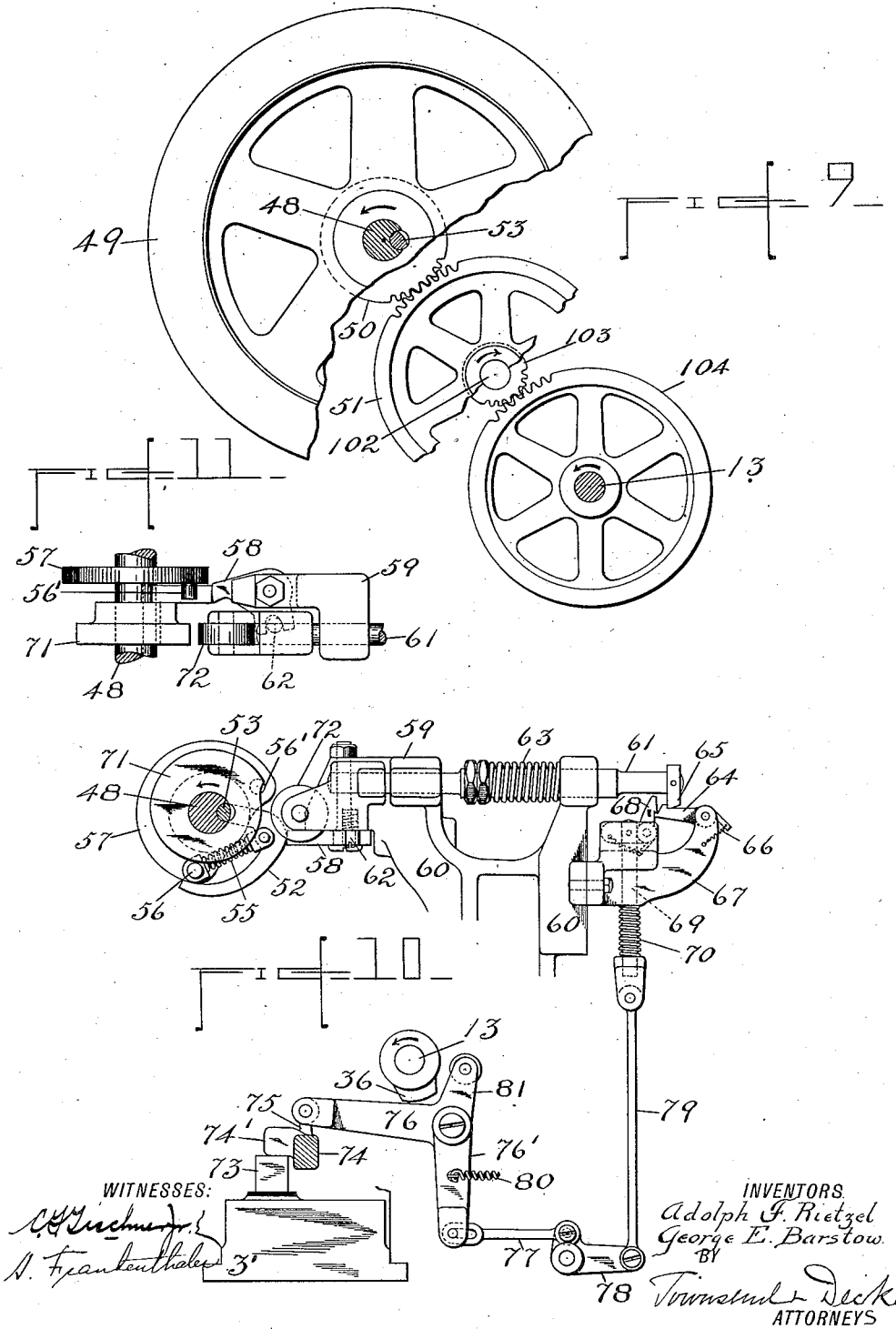

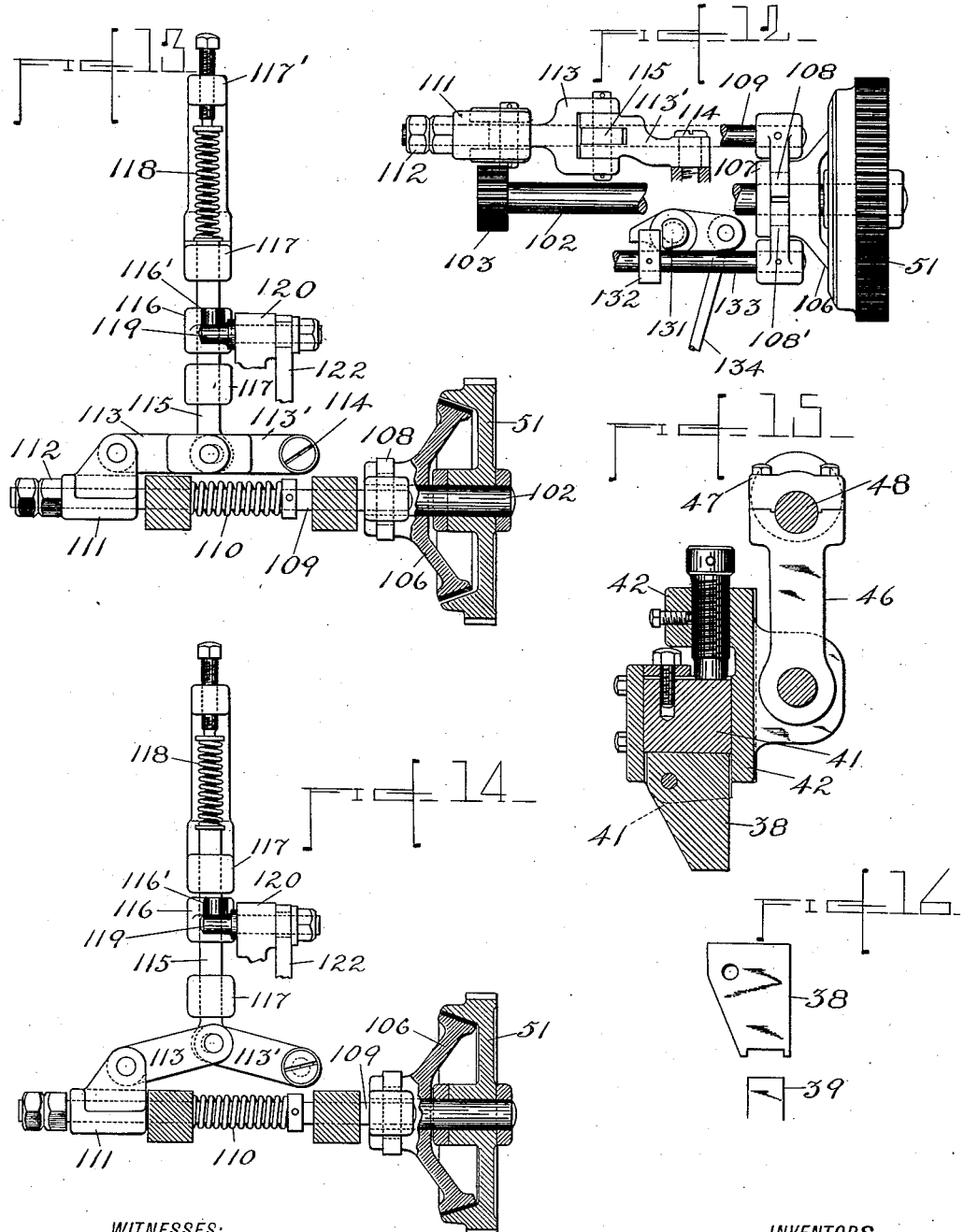

No. 821,061. PATENTED MAY 22, 1906.
A. F. RIETZEL & G. E. BARSTOW.
AUTOMATIC ELECTRIC METAL WORKING MACHINE.
APPLICATION FILED DEC. 5, 1904.
8 SHEETS—SHEET 7.
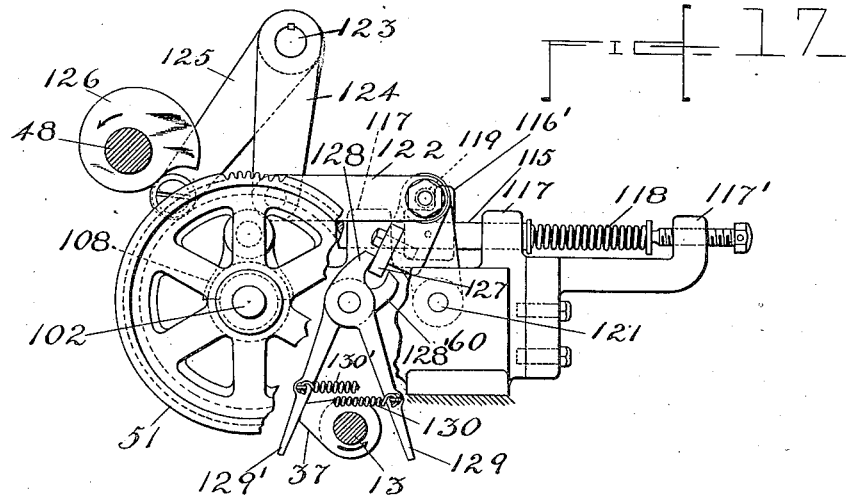
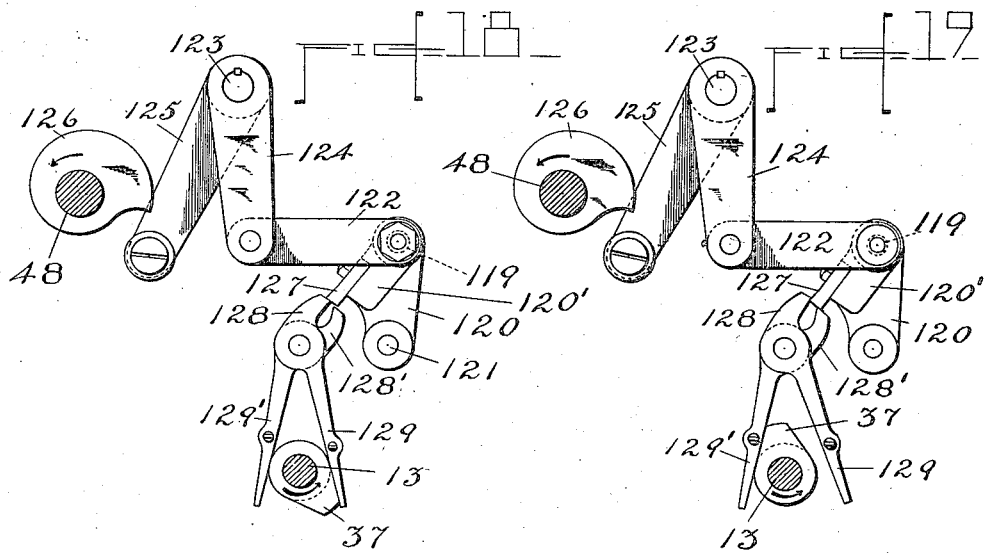
WITNESSES:
INVENTORS
Adolph F. Rietzel
George E. Barstow.
BY
Townsend & Decker
ATTORNEYS No. 821,061. PATENTED MAY 22, 1906.
A. F. RIETZEL & G. E. BARSTOW.
AUTOMATIC ELECTRIC METAL WORKING MACHINE.
APPLICATION FILED DEC. 5, 1904.
8 SHEETS—SHEET 8.
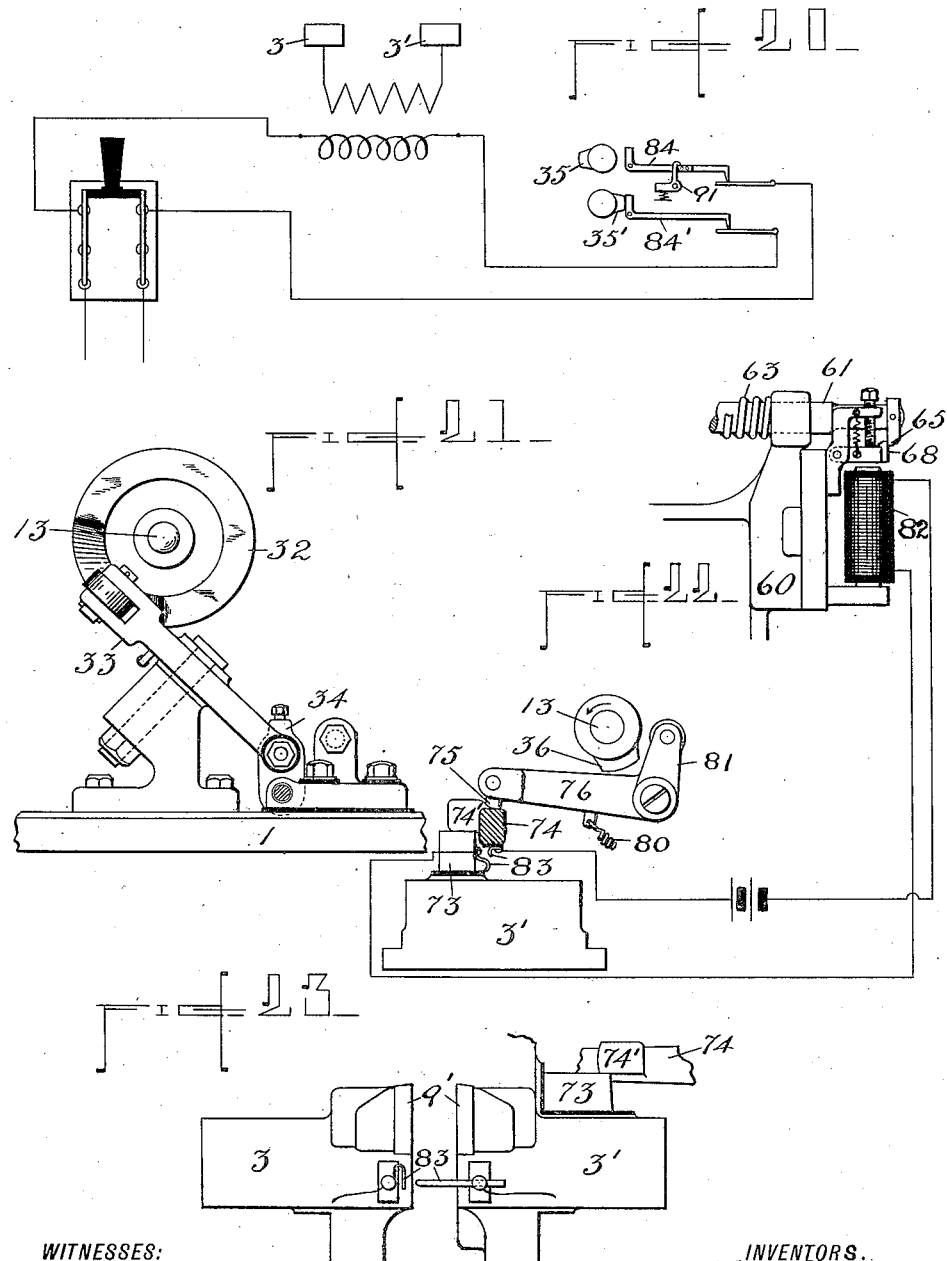
WITNESSES:
INVENTORS.
Adolph F. Rietzel
George E. Barstow.
BY
Townsend & Decker
ATTORNEYS

UNITED STATES PATENT OFFICE.

ADOLPH F. RIETZEL AND GEORGE E. BARSTOW, OF LYNN, MASSACHUSETTS, ASSIGNORS TO THOMSON ELECTRIC WELDING COMPANY, OF LYNN, MASSACHUSETTS, A CORPORATION OF MAINE.

AUTOMATIC ELECTRIC METAL-WORKING MACHINE.

No. 821,061.      Specification of Letters Patent.      Patented May 22, 1906.

Application filed December 5, 1904. Serial No. 235,562.

*To all whom it may concern:*

Be it known that we, ADOLPH F. RIETZEL and GEORGE E. BARSTOW, citizens of the United States, and residents of Lynn, in the county of Essex and State of Massachusetts, (whose post-office address is Lynn, Massachusetts,) have invented certain new and useful Improvements in Automatic Electric Metal-Working Machines, of which the following is a specification.

Our invention relates to an electric metal-working apparatus wherein the work is heated to the desired extent by the passage of electric currents through the section of metal to be welded, forged, or otherwise operated upon.

The main object of our invention is to provide a machine which shall be automatic in all its actions and in which nothing shall be required of the attendant save to place the work in the machine and to remove it therefrom.

While we have described our invention as carried out in a machine in which a forging tool or implement is used upon the heated section of work after it has been rendered sufficiently plastic, it will be readily understood that we do not limit ourselves to the use of such tool, since the principle of operation of the parts of our machine would be applicable to a machine in which no forging-tool should be employed. It will be also obvious from the subjoined description that the principles of operation of our invention could be employed in a machine in which provision should be made for automatically inserting and withdrawing the work from the machine.

One part of our invention relates to the special means whereby the operation of the forging-tool is made to depend upon the yielding of the work to pressure when it assumes a plastic condition through the heating effect of the electric current.

Another part of our invention relates to the special devices for controlling the motions of a master-shaft which is provided with means for bringing the various parts of the machine into operation in the required sequence. This part of our invention consists, among other things, broadly, in making the restarting of the master-shaft after it has been brought to rest automatically through the yielding of the work dependent upon the operation of the forging devices which themselves are brought into action automatically by the movement of the parts which are permitted to move through yielding of the heated section of work.

Our invention relates, further, to that class of electric metal-working apparatus wherein pressure is applied to the heated section of work for the purpose of effecting the weld or for other purpose by means of spring or other power. The object of this part of our invention is particularly to prevent disruption of the heated section by too sudden application of the compressing force; to which end the invention consists in the application of a counteracting spring or other retarding means adapted to delay or slow down the operation of the device by which the welding or other pressure is applied, as hereinafter more particularly set forth.

Our invention consists also in special means for applying and regulating the retarding effect.

Our invention consists also in the special combinations of devices and mechanisms hereinafter described and then recited in the claims; and, further, in special constructions and combinations of the mechanisms used for controlling the flow of heating-current and for starting and stopping the master-shaft and the forging-tool, all of which will be described, and then pointed out more specifically in the claims.

Our invention is especially useful for welding-machines employed for welding thin stock, such as bale-ties or hoops, but is applicable likewise to machines designed for other work.

In the accompanying drawings, Figure 1 is a front elevation of a machine embodying our invention. Fig. 2 is a front elevation of the upper portion of the machine, the press being removed. Fig. 3 is a side elevation of the machine. Fig. 4 is a plan of the automatic switch or current controller that controls the flow of current through the work. Fig. 5 is a side elevation of one arm of the current-controller and the tripping mechanism. Fig. 6 is an enlarged side elevation of one arm of the current-controller in open position. Fig. 7 is a plan of one of the work-holders. Fig. 8 is a side elevation of the same. Fig. 9 is a side elevation showing the train of gearing between the power-wheel and the master-shaft, the intervening mechanism being removed. Fig. 10 is an elevation of the mechanism for starting the forging-tool automatically when the work-holding slide is permitted to move forward by the softening of the work. Fig. 11 is a plan of a portion of said mechanism. Fig. 12 is a front elevation of part of the mechanism for stopping the master-shaft. Fig. 13 is a plan of the same in a position where the master-shaft has been thrown out of gear. Fig. 14 is the same as Fig. 13, except that the master-shaft is revolving. Fig. 15 is a vertical section and partial elevation of the press or forging mechanism. Fig. 16 is a modification of the form of the die or tool. Fig. 17 is a side elevation of part of the device used to stop the revolution of the master-shaft, parts having been broken away. Fig. 18 is a view of the same at a different stage in the operation. Fig. 19 is a view of the same at a still further stage in the operation. Fig. 20 is a diagram of the electric circuits of the machine. Fig. 21 is an elevation of the device for releasing the movable work-holder and allowing it to move forward. Fig. 22 is a modification in the form of the device for starting the press or forging mechanism. Fig. 23 is a modification of Fig. 22.

1 is the main table or platform of the machine and is supported by the legs 2. Superposed on the table 1 is the framework, carrying the operating mechanisms, as will be presently described.

3 3' indicate work-holding slides or carriers consisting of sliding blocks or platens, consisting of suitably-formed castings, upon which are mounted work-holders comprising clamping devices for clamping the work. These, as usual in the art, may be in electrical connection with any suitable source of heating-current in order to supply current to the work, and one of them is suitably mounted and guided so as to permit it to be moved toward and away from the opposite platen. 3' is the movable platen which works in suitable guides 4, mounted upon, but insulated from, the table 1. Current may be supplied to the work through the platens or blocks 3 3', which for that purpose may be terminal blocks of the secondary of a transformer which may be constructed as described in United States Letters Patent issued to A. F. Rietzel, No. 649,179, dated May 8, 1900. The flexible terminals 5 5' of said secondary are connected to the blocks or platens 3 3'. The principal portion 6 of the secondary is a casting in which currents are induced by a primary coil, the flow of current in which is governed by the circuit-controller, which will be presently described. The transformer is sustained beneath the table by bolts 7, which pass through ears or lugs on the transformer secondary casting 6 or in any other suitable manner. Mounted on the platens or blocks 3 3' are clamp bodies or frames 8 8' and composed, preferably, of an extension of the blocks or platens 3 3'. Each clamp-body carries a pair of clamping-jaws 9 9'. The upper jaw 9, which may be of the construction in the patent to A. F. Rietzel, No. 719,508, dated February 3, 1903, or of any other desired construction, is mounted on a lever 10 and is forced toward the opposite jaw by the action of a spring 11 or other device adapted to clamp the work to be heated. The clamp-lever 10 on the sliding or movable block 3' is acted upon by a cam 12', secured to an intermittently-revolving shaft 13 and adapted to engage with a friction-roller 14 on the lever 10. A similar cam 12 operates on the lever 10 for the clamping-jaw on the opposite or fixed block or platen 3. This shaft 13 is hereinafter termed a "master-shaft" and besides carrying means for controlling the movements of the work-holding slide and the operation of the clamping devices for the work also carries means whereby the flow of heating-current in the work may be established and means whereby the shaft may be brought temporarily to rest at a certain stage of the operation. These means consist, preferably, of suitable cams and coacting parts.

As shown in Fig. 8, the cams 12 12' may be so formed that the clamp-lever in the stationary platen will be operated by the cam to free the work slightly before the lever on the movable or reciprocating platen. The work is clamped by the action of the springs 11 so long as the levers are free from engagement by the cams. The manner in which the shaft 13 is started and stopped will be presently described. Shaft 13 is mounted in bearings 15 on standards 16, fastened in any suitable manner to the top of the table. The lower jaws 9' are held against the face of a projection 17 from the clamp-body by means of a bolt 18, passing through an enlarged opening in the projection, so as to permit vertical adjustment of the clamp-jaw by means of adjusting-screw 19. By loosening the clamp-bolt 18 and turning screw 19 the jaw may be adjusted vertically for wear of its biting-face or for other purposes and when adjusted may be fixed in position by the bolt 18. Each jaw 9' works in suitable guides formed in the face of the projection 17. The platen 3' is forced toward the opposite platen or block by any suitable means—as, for instance, by means of the spring 20, which enters a socket in the rear of the block. The screw 21, mounted in the post 22, serves to adjust the compression of the spring 20 and the force applied by the spring to the platen and through the same to the heated section of work between the two sets of clamping devices.

In the operation of welding or otherwise working thin stock the heated section of the work when it is in a highly-plastic condition would be disrupted by a too sudden application of the compressing force that is used to move the one block or platen, with its clamping devices, toward the other. This is a difficulty which is met with particularly in the operation of automatic machines wherein a spring is employed to exert the usual welding or upsetting pressure, and is permitted to operate as soon as the work becomes plastic by the heating effect of the current, thus permitting the block or slide to which the spring is applied to move forward. To avoid this trouble, we propose to combine with the spring some means for retarding the action thereof and the consequent movement of the parts as the work softens. Such retarding appliance may conveniently consist of a counteracting or opposing spring, which, if it be applied so as to oppose the action of the spring 20, during the whole movement of the slide 3' should be weaker than the spring 20.

The counteracting or retarding spring is here shown as a coil-spring 23, suitably connected to the slide 3' through the rod 24, one end of which is pinned to a lug 25 beneath the slide, while its opposite end is coupled to one arm of a lever 26, the other arm of which engages spring 23 and compresses the same between block 27, carried on the end of the lever and the end of an adjusting-screw 28, which is mounted on a suitable arm or bracket 29, fastened to the flange 30, depending from table 1. This screw 28 serves to take up the space between the end of the spring and the bracket when it is necessary to narrow the distance between the slides 3 3' for the purpose of welding narrow-width stock. In that case the screw is set up against spring 23, but not so as to put the spring under tension, as the spring is not designed to act until the slide begins to move. On the other hand, if it be desired to weld wider stock it is necessary to increase the space between the slides, which would put the spring under pressure while the slide 3' is at rest, to avoid which the adjusting-screw 28 is set back. The lever 26 is fulcrumed on a pin 31, whose vertical position is adjustable for the purpose of varying the relative length of the arms connected to the rod 24 and to the spring 23, thereby permitting the retarding effect of the spring 23 upon the action of the spring 20 to be adjusted for different sizes of work.

The slide 3' is retracted by the action of the cam 32 on the intermittently-rotating shaft 13 or other appliance timed to act in the cycle of operations, as will be described under the general operation. This cam is formed in the face of a disk which is engaged by one arm of a lever 33, the other arm of which acts on the slide 3' in any suitable way—as, for instance, by impinging against a projection on the rod 24, which projection comprises, preferably, an adjustable screw 34, by adjusting which the extent to which the slide 3' is retracted may be varied for different sizes of work. The intermittently-rotating shaft 13 also carries two cams or lugs 35 and 35', which act upon the two members of the circuit-controller, which will be described later on. Another cam 36 on said shaft is employed to automatically reset a part of the devices which automatically couple the power to the press or hammer mechanism when the slide 3' has been permitted to move forward by the work assuming plastic condition. An additional cam 37 upon said shaft is used in connection with the devices which couple and uncouple the shaft 13 from the power to secure intermittent rotation thereof.

We will first describe the manner in which the press or hammer is automatically brought into play and then describe the means for securing intermittent rotation of the shaft 13.

38 is the upper press or die, which plays in the space between the upper clamping-jaws of the two pairs of clamping devices, and 39 is the lower or anvil member of the press employed to form or shape the work when sufficiently heated by the current. The lower member may be detachably secured in a block 40, secured to and preferably insulated from the top of the table, as shown more clearly in Figs. 1 and 3. The upper die or press 38 is fastened to a block 41, which is adjustably mounted in a head 42, working in guides 43, which are bolted to posts 44, rising from the casting which has the guides 4 for the slide 3'. The posts are fastened by bolts 45, passing up through the edge of the table. The head 42, which carries the upper press or die 38, is reciprocated by pitman 46, pivotally connected with the head 42 at the rear thereof, as shown in Fig. 15, and actuated by a crank or eccentric 47 on the shaft 48, which turns in bearings at the top of the casting or frame carrying the guides for the press-head 42. Shaft 48 normally stands at rest. The power-wheel 49, driven in any suitable manner, normally runs freely on the end of said shaft, and its hub carries the gear-wheel 50, gearing with wheel 51, from which motion is imparted to the cam-shaft 13, as will be presently described. The power-wheel is coupled to shaft 48 for the purpose of operating the press by means of a clutch or coupling device connected to a controlling arm or lever 52.

The form of clutch employed by us is not material to our invention. That shown comprises a coupling pin or key 53, adapted to rock or turn in a groove formed in the shaft 48 and cut away or mutilated at its edge opposite a recess on the inside of the hub 54 of the power-wheel, so that when the parts are in the position shown in Fig. 10 the hub of the power-wheel may rotate freely without being coupled to the shaft.

A spring 55, attached at one end to a stud 56, projecting from a disk 57, fastened to the shaft and attached at its other end to the bent arm or lever 52, which is carried by the clutch-key, tends normally to turn the key or pin so as to bring the unmutilated portion thereof into the recess on the inside of the hub, as shown in Fig. 3. A stop-pin 56', set in the side of the disk 57, limits the movement of the clutch-controlling arm when actuated by the spring 55. When so turned, the hub and shaft are locked together, and the said shaft rotates, carrying with it the controlling arm or lever 52. The key is normally restrained from turning by the dog 58, Figs. 10 and 11, which is mounted in a fixed arm or bracket 59, extending from frame 60, which is attached to or forms a vertical extension of one of the standards 16. The dog 58 is operated by a rod 61, having a pin 62, which plays between the arms of a yoke carried by the dog. Said rod 61 reciprocates in bearings in the frame 60. A spring 63 acts on the rod in a direction to operate the dog 58 and release the arm 52, so that the clutch pin or key may turn and couple the power-wheel to the shaft. The spring is, however, normally restrained from so doing by a pivoted catch or detent 64, held in engagement with a shoulder 65 on the rod by means of a spring 66. The catch 64 is mounted in a bracket 67, projecting from frame 60, and is operated by a dog 68, pivoted in a plate secured to the end of a rod 69. Applied to the rod is a spring 70, which is permitted to force the rod 69 downward and disengage the catch 64 when said spring is freed from restraint by the moving forward of the slide 3', as will be presently described. When this occurs, the parts assume the position shown in Fig. 3. The rod 61 is reset to the position shown in Fig. 10 by the action of cam 71, fixed on the shaft 48 and which is arranged to force the rod 61 backward by engaging friction-wheel 72, mounted in the end of rod 61. This cam completes its action upon one revolution of the shaft 48 and by so moving the rod 61 carries the dog 58 back to position where it will be in the path of the curved arm of the clutch-controller lever 52, and thereby swing the same back to position for uncoupling the power-wheel from the shaft.

The means connected to the work-holding slide 3' for governing the action of the devices which release the clutch and cause it to couple the power to the press or other shaping or forging device when the work is sufficiently softened by the heating-current may be constructed as follows: 73 is a block secured to the slide 3', but preferably insulated therefrom and serving as a means for releasing the controlling-lever 74, which is pivoted on the post 22 or other suitable support and has a lateral projection 74', normally sustained on block 73. The lever 74 is connected by a link 75 with an elbow-lever 76, provided with depending arm 76', having a pin working in the slot in the end of link 77, which link is connected in turn with bell-crank lever 78, joined by rod 79 to the rod 69 before described. The pin-and-slot connection between link 77 and arm 76' allows a certain amount of lost motion.

A spring 80, connected to the arm 76', draws the projection 74' down behind the block 73 when the work-holding slide 3' moves forward. When the projection 74' rests on the top of the block 73, the arm 76' is thereby held in position shown, where, through its connection with the rod 69, it will hold the same elevated against the tendency of the spring 70 to lower said rod and to thereby free the catch or detent 64. As soon as, however, the arm 76' is freed by the forward movement of the slide it moves to the right, thereby freeing the spring 70 and whereupon the detent 64 is actuated to free rod 61, and thereby connect the power to the shaping or forging die or press. In addition to operating as the prime controlling device in bringing the shaping or forging devices into operation the projection 74' of lever 74 by dropping down behind the shoulder of the block 73 acts as a lock to hold the slide in its forward position during the operation of the shaping or forging die upon the heated section of the work. By this means the spreading of the work by the operation of the die is effectually prevented. This is important, particularly in the case of butt-welding, since it effectually overcomes any tendency of the joint to open during the action of the press or die when used to reduce the bur.

It will be seen that while a very small movement of the mechanism is required in order to release the catch or detent 64 it is nevertheless desirable that the lever 74 should have a large movement in order that the lock may move down fully behind the block 73 to effectually lock the same against rearward movement. The object of connecting said lever 74 with the dog 68 through mechanism having at some point a lost motion— thus, for instance, at the point of connection between the arm 76' and 77—is to permit this relatively large movement to take place. In other words, after the lever 74 has moved downward sufficiently to free the catch 64 it may still continue its movement without moving or permitting movement of the rod 69 and dog 68 under the action of spring 70. The restoration of lever 74 and dog or latch 68 to the normal position is effected by means of the cam 36 on intermittently-rotating shaft 13, which cam operates for this purpose on the arm 81, extending from lever 76.

Instead of coupling the constantly-running motive power to the tool we might start the motive power which operates the tool. So, also, instead of using mechanical control of the starting mechanism we might use electrical control—as, for instance, by causing the forward movement of the work-holding slide to release or operate a circuit-controller having in its circuit a magnet 82, whose armature carries the dog or latch 68, as indicated in Fig. 22. In this instance the circuit-controller (whose points are indicated at 83), might have one of its members carried by the lever 74 and the other mounted on a suitable fixed support. In this case the arm 76' and the remaining mechanical connections between the same and the dog or latch 68 in Fig. 10 could be dispensed with. It should be mentioned that when the lever 74 drops to position shown in Figs. 1, 2, and 3 it may be stopped by engagement of the members of the circuit-controller, or when mechanical control is employed throughout it may be stopped by the head, which carries the dog 68, reaching the limit of its downward movement and coming into engagement with a shoulder on the bracket 67. It will also be obvious that the movable member of the circuit-controller 83 might be carried by other parts—as, for instance, by the slide 3'—the fixed member being suitably mounted so as to be engaged by said movable member when the work softens and the slide moves forward, as indicated in Fig. 23.

The circuit-controller for controlling the flow of the heating-current in the work comprises two independently-operable but co-acting members, through which the starting-circuit is completed in series. One of said members 84 is set in circuit-closing position by the cam 35 on shaft 13 and temporarily latched there until by the action of the forging device the latch is tripped and the said member is allowed to break circuit. The other member 84' is set and maintained in circuit-closing position by the action of cam 35' on shaft 13, which for this purpose is made to temporarily maintain position in which the cam would hold the lever down. The poles of the circuit to be closed are connected, respectively, to the contact-springs 85 and 85', which are insulated and are engaged, respectively, by contacts 86 and 86', carried by the levers 84 and 84', but insulated therefrom and connected to one another by wire 87. When both levers or members 84 and 84' are down, the starting-circuit, which, as indicated in the diagram, Fig. 20, may be the primary circuit of the transformer, is closed, and heating-current would then be generated in the secondary and flow through the work, closing the gap between the two pairs of said work-holders. The levers 84 84' each have a tailpiece or arm 88, to which is connected a spring 89, for the purpose of throwing the lever up and breaking the connection when the lever is freed. Each also has an upward-extending arm 90, upon which the cams on shaft 13 act to depress the levers. When lever 84 is depressed by transient action of cam 35, it is held down by the latch 91, having a heel-piece engaged by a spring 92, which tends to hold the latch over in locking position. The lever 84 is freed or unlatched by means of a pin 93, carried by the lower end of a lever 94, which swings upon the spindle-carrying levers 84 84'. Said pin by engaging the upper side of the heel for latch 91 operates the same and unlatches the lever. The lever 94 is operated for this purpose by the forging or shaping mechanism. For this purpose we may, for instance, employ a pin 95, projecting from some portion of the tool-holder or actuating devices—as, for instance, from the block 41, carrying the die or press 38. Said pin on the downward movement of the tool engages a shoulder or projection on an arm 96, depending from a rock-shaft carrying an arm 97, which is connected by a link 98 with lever 94 or by other suitable means. A retracting-spring 99 is connected to an arm projecting from the arm 96. When the tool rises after doing its work, carrying the pin 95 with it, the spring 99 restores the pin 93 to position where the latch 91 will be free to lock the lever 84 down when the same is depressed. The parts of the said circuit-controller are mounted on a suitable base 100, secured to the top of but perfectly insulated from a post 101, rising from the table 1.

The means for automatically controlling the rotation of the cam or master shaft 13 are shown in detail in Figs. 12, 13, 14, 17, 18, and 19. One of the special objects of these devices is to provide for temporarily stopping said shaft when it reaches the position in which the work has been properly clamped by the action of the cams 12 12' and the work-holding slide or carrier 3' has been released by the cam 32 and to cause such temporary stop of the shaft to be maintained or delayed until the work is sufficiently heated. We prefer to produce the rotation of the shaft by a continuously-acting power which is intermittently coupled to and uncoupled from the shaft by means of a suitable clutch, although it would be within our invention in its broader aspects to produce the intermittent rotation by the starting and stopping of the prime mover. The controlling devices which we employ for securing this action comprise, briefly stated, a pair of co-operating detents, one of which, 128', operates to hold the controlling devices in position in which the cam-shaft will rotate and is released automatically by said shaft when it is necessary to stop the same during the heating operation, while the other member 128 acts to temporarily hold said controlling mechanism in position to permit rotation of the shaft, when said mechanism is reset by the operation of the press and until the camshaft after the resumption of its rotation has permitted the first-named member to assume position for keeping the shaft in rotation until the time again comes for the shaft to automatically stop itself.

When a clutch mechanism and controlling device therefor are employed, they may be constructed as follows:

Wheel 51, as already stated, is continually rotated from a gear 50 on the hub of the power-wheel and normally turns freely on a counter-shaft 102, carrying at its opposite end the gear 103. When gear 51 is coupled to shaft 102 by the friction-clutch disk or wheel, the gear 103 turns the shaft 13 by meshing with the wheel 104 on a cam-shaft 13. Clutch-disk 106 is keyed on shaft 102, but is capable of sliding thereon, so as to engage with or be disengaged from wheel 51. In the hub of the wheel or disk 106 is a groove in which engage the arms of the fork 108, secured to a rod 109, upon which a spring 110 acts to force the members of the clutch together, in which condition cam-shaft 13 rotates. On the rod 109 is a sleeve 111, to which is jointed one member 113 of the toggle, the other member 113' of which turns on the pin 114, secured to a boss rising from the casting at the back of the plates 105.

The members of the toggle are connected to a rod 115, extending horizontally through bearings 117 on the castings 60 and working against a spring 118, compressed between the end of the rod and a set-screw in bracket 117'. When by the action of the spring 118 the rod straightens the toggle, the sleeve 111 by acting on the nuts 112 on the end of rod 109 retracts, overcomes spring 110 on said rod, and disengages the clutch, so as to bring the shaft 13 to rest.

For permitting the spring 110 to bring the members of the clutch in engagement the toggle-actuating rod is retracted by means of a pin 119, which engages a shoulder 116', projecting from a sleeve 116, secured to the rod. Said pin is carried by an arm 120, rocking on a pin 121, secured to the casting at some portion of the frame. Said arm is actuated in any suitable manner from the press or forging apparatus—as, for instance, by the cam 126 on the crank-shaft 48, which operates the press. This cam acts on the arm 120 through arm 125, secured to one end of a rock-shaft 123, which is mounted in a casting on the top of the framework which carries the crank-shaft 48, and which rock-shaft has at its opposite end an arm 124, connected by link 122 to arm 120.

The pin 119 and its associated devices are maintained in the position to couple the shaft 13 to the power and are released from such position in order to uncouple and stop the shaft by means of the compound detent device before described. This detent holds the arm 120 against the movement by the spring 118 or other spring applied to a suitable portion of the mechanism and by releasing the arm allows the spring to act and uncouple the members of the clutch. The two members of the detent are shown as consisting of two independently-operable pivoted detents 128 128', which are engaged by the dog or tooth 127, secured to projection 120' on arm 120. The detents are provided, respectively, with operating-arms 129 and 129', to which are applied suitable springs 130 and 130', normally acting to set the detents in position where they may hold the tooth or dog 127. The cam-shaft 13 operates on the arms in the manner to cause the detents to release the dog 127, preferably in a direct manner by means of cam 37, secured to said shaft.

As already described, the cam or master shaft 13 carries in all, exclusive of the detent-operating cam 37, six cams. Two of these, 12 12', (see Fig. 8,) control the operation of the clamping devices on the two work-holders. Two others, 35 35', operate the circuit-controller, which establishes and disestablishes the flow of heating-currents through the work. A fifth cam 32 controls the action of the slide or platen 3', carrying one set of work-holding devices, and acts alternately to retract said slide for the purpose of inserting a new piece of work and then to free the same to permit the spring 20 or other device to bring the two parts to be welded into contact and apply pressure thereto. A sixth cam 36 resets the locking devices which holds the work-holding slide during the operation of the press, hammer, or other forging appliance and also resets that element of the mechanism which brings the forging device into operation and which is in immediate connection with and under the control of said slide. In the present case, as already set forth, the same device—to wit, lever 74 and its projection 74'—operates as the prime controlling device which governs the actions of the hammer, press, or other forging tool and as the locking device. Normally the cam-shaft 13 is rotating, since the members of the toggle 113 and 113' are in the position shown in Fig. 14, being held in such position against the force of spring 118 by the controlling dog or tooth 127, which is detained by one of the members of the compound detent, excepting at one stage of the cycle of actions, as will be presently described. Normally the shaft 48, which operates the tool, is at rest, being uncoupled from the power by reason of the fact that the clutch-lever 52 is detained by the dog 58 in the position shown in Figs. 10 and 11 until the work has been heated.

The general operation will be described, starting at that stage of the cycle of operation when both clamping-levers are lifted by the action of the cams 12 12', so as to permit the insertion of the work, and are just about to free said levers by reason of the shoulder *a* on both cams simultaneously or approximately at the same time passing from contact with the rollers 14 on said levers, so as to free the spring 11 and allow them to clamp the work. As soon as the work is clamped cam 32 releases the slide 3' and the spring 20 moves the same forward and brings the two pieces to be welded firmly into contact. The work is now ready to be heated and the cam 35' now comes into play, and its forward shoulder throws down the member 84' of the circuit-controller to start the flow of heating-current. At a previous stage in the cycle of actions the member 84 of said circuit-controller has been set by the action of the cam 35, as will be presently described, so that the cam 35' when it acts will complete the remaining gap in the starting-circuit. As soon as the flow of heating-current is established by the action of the cam 35' the rotation of the cam or master shaft 13 is interrupted and the same remains at rest to allow time for the heating, and preferably also for the completion of the forging operation. The stopping of the cam-shaft 13 is effected by the operation of the cam 37, which in the meantime has moved forward through the position shown in Fig. 19 to the position shown in Fig. 17, so as to remove the detent 128' and release the dog 127. The position of the compound detent and dog shown in Fig. 19 is the result of the action at a subsequent stage of the cycle, prior, however, to that stage or step at which the operation is assumed to have begun. When the dog or tooth 127 is freed, the arm 120, carrying the same and the pin 119, Fig. 14, is permitted to move under the action of the spring 118, connected to the toggle, and the latter being straightened so as to assume position shown in Fig. 13 disconnects the members 106 51 of the clutch through which the power-shaft imparts rotation to the cam-shaft 13. The heating-current having been turned into the work and the slide left to the action of the spring 20, the work gradually heats and softens, the cam-shaft 13 now being at rest, and finally the work-holding slide by moving forward brings the press, die, or other forging implement into action. It should be premised that when the shaft 13 stops the cam 36 thereon is approximately in the position shown in Fig. 10, the cams 12 12' in the position shown in Fig. 8, the cams 35 35' in the position shown in Figs. 4 and 5, and cam 37 in the position shown in Fig. 17, said latter cam 37 having, as already described, removed the detent 128' from the path of the dog 127 to free the same and bring shaft to rest, as already stated. The starting of the press or die is effected by the releasing action of the slide 3', which permits the lever 74 to drop, thereby, as already described, permitting the rod 69, Fig. 10, to free and release connecting-rod 61, which thereupon removes the dog 58 from engagement with the clutch-lever 52 and the latter thereupon couples the power to the crank-shaft 48, to which the tool is connected. Said shaft thereupon makes a whole revolution independently of the movement of the other mechanism, brings the die into contact with the work, withdraws the same, and finally comes to rest through the automatic action of its cam 71, which resets the dog 58 and the connecting-rod by whose release said shaft 48 was started, as already explained. When the lever 74 drops, its projection 74' by falling behind the block 73 on the slide 3' prevents the latter from receding under the expansive effect of the metal in the holders when compressed by the die or tool. Just about the time that the die or tool reaches the work the current-controller is caused to stop the flow of current by the action of the pin 95, connected to the die, and acting through the rock-arms 96 and 97 and connecting-rod 98 upon the latch 91 to free the arm 84 of the compound circuit-controller. As will be seen, the circuit is broken by this action, although the shaft 13 may still remain at rest or in a position to hold the arm or member 84' of the current-controller in contact with spring 85. The die-operating shaft 48 in the course of its revolution restarts the cam-shaft 13 from the position in which it has been delayed for the heating and forging operation. This is effected by the cam 126 on shaft 48, which, through the rocker-arms 125 124 and link 122, causes the pin 119 to force the toggle-rod 115 back again to the position shown in Fig. 14, thereby coupling the shaft 102 with the driving power. As the arm 120, carrying the pin 119, recedes the dog 127 is moved from position shown in Fig. 17 to position shown in Fig. 18, whereupon the member 128 of the detent springs under the dog and thereby temporarily holds the parts in position for maintaining the revolution of cam-shaft 13. When the latter moves from its temporary position of rest, it finally frees the dog 128', and the latter under the action of the spring 130' moves into position under the dog 127 to receive the same and still maintain the parts in position necessary for rotation of the shaft 13 after the said shaft with its cam 37 has carried the detent 128 away from the stop position by passing beyond the position shown in Fig. 18 on its way to repeat the cycle of actions. After the cam passes beyond position of engagement with the arm 129 the detent 128, being slightly longer than detent 128', is prevented from again springing under the dog 127 by engaging the side of said dog, which at such time is resting on the shorter detent 128'. Before passing around to position or again automatically stopping itself by freeing the detent 128' the cam-shaft 13 performs the following operations:

When the cam-shaft restarts, the cam 36 by acting on the arm 81, Fig. 10, raises the lever 74, and immediately after the cam 32, through lever 33, presses the slide 3' back under projection 74' and maintains the slide in such position until the time comes to surrender it to the action of the spring 20, as already described. Just before the cam 32 acts on the slide the cam 12 operates on the clamp-lever 10, mounted on the slide 3, so as to free the work therefrom and permit the slide 3' whose clamp still grasps it to move back. As soon as the cam 32 has moved the slide 3' back as far as it will go the cam 12' acts and frees the work from the clamping devices on the slide 3'. The clamps are now both open ready for a new piece of work, and when the operator inserts the same the cycle of actions described is repeated. After the shaft 13 has restarted, and at any time subsequent to the time that it has moved forward sufficiently to free the circuit-closing lever 84', but before said heating-current is again required, the cam 35 on said shaft 13 resets the lever 84 ready for another operation. The lever is held in this position as already described by latch 91. Should the operator not place a new piece of work in the clamps before they close, the slides will move forward instantly without any delay incident to the gradual softening of the work, and the shaft 48 will be started so soon that its cam 126 will have reached position to hold the dog 127 in lifted position at the time that the cam 37 on shaft 13 reaches position to free said dog by operating the detent 128'. Hence the dog will not be permitted to drop to the position shown in Fig. 17, which it must do in order that the toggle may be acted upon so as to free the clutch-disk 106, and the shaft will therefore revolve continuously and not pause at the heating position.

From the foregoing description of the operation it will be seen that the master-shaft automatically stops itself, but that the restarting of the same is brought about by the yielding of the heated section of work to the pressure automatically applied thereto. For convenience and also for the purpose of insuring the stoppage of the master-shaft until the forging operation is completed we prefer to include the operation of the forging mechanism in the train of actions between the yielding of the work and the restarting of the shaft. The essential feature, however, of our invention lies in delaying the restarting of the master-shaft until the work has reached the desired degree of plasticity, which degree might be different for different machines, materials, or kinds of work. If an automatic forging operation is employed, the period of delay is preferably extended so as to include that operation which takes place in the machine after the work has been heated to the desired degree of plasticity. This, however, is not essential to our invention.

Inasmuch as the operations of the machine depend upon the degree of plasticity of the work the same machine may be successfully used for stock of different thickness or cross-section.

In order to permit the operator to stop the machine at any stage of the cycle of actions, we provide some means for disconnecting the master or cam shaft 13 from the driving power, so as to bring the same to rest. This is conveniently accomplished by providing an additional yoke 108', engaging a groove in the hub of the clutch-disk 106 and operating the same to hold the clutch-disk back against the action of the spring 110 by means of a rocker-cam or eccentric 131, which is adapted to engage a shoulder 132, secured to a rod 133, carrying the yoke 108'. Said cam is rocked by means of a rod 134, attached to an arm 135 of a rocker, another arm 136 of which is joined by rod 137 with a treadle 138. A spring 139, Fig. 2, attached at one end to the table 1, its other end being fastened to the arm 135, serves to normally keep the rocker-cam or eccentric 131 out of engagement with the shoulder 132. A sleeve 142 slides on the cross-bar 140 of the frame 2 and carries a projection 141, which serves to lock the treadle when it is desired to stop the machine.

Fig. 16 illustrates a modification in the form of the upper die or tool 38, whereby the bur incident to welding the two pieces of metal together can be removed at the time of forming the weld.

We claim as our invention—

1. In an electric metal-working apparatus, the combination of a work-holder, a spring for applying spring-pressure to upset the heated section of work and a counteracting-spring acting on the holder to oppose the action of the first-named spring during the forward movement of the holder as the work softens.

2. In an electric metal-working apparatus, the combination of a work-holder operated by spring-pressure during the upsetting of the softened metal and means for exerting an opposing action to said spring-pressure increasing in amount with the movement of the parts in such upsetting operation.

3. The combination in an electric metal-working apparatus, of a clamping device, a suitable slide or block carrying the same, a spring of sufficient power to apply the welding or upsetting pressure to the work, means disconnected from the slide for putting said spring under compression, and a counteracting-spring of less power acting to oppose the spring-pressure exerted by the first-named spring and thereby prevent too sudden action when the work becomes fully softened.

4. In an electric metal-working apparatus, the combination of a spring for applying a determinate upsetting pressure to the work and means for applying a counteracting force of increasing amount as the work softens.

5. In an electric metal-working apparatus, the combination of means for applying an upsetting spring-pressure to the work and means for retarding the action of said spring as the work softens.

6. In an electric metal-working apparatus the combination with a work-holder of means for forcing it toward the opposite work-holder, a counteracting-spring and an intermediate lever having an adjustable fulcrum.

7. In an electric metal-working apparatus the combination with means of applying welding pressure to the heated work, of a counteracting-spring and a lever through which the counteracting effect of said spring is transmitted and means for changing the position of the fulcrum of said lever to vary the counteracting effect.

8. In an electric metal-working apparatus the combination with a block for applying welding pressure to the work, of means for forcing the block forward to affect the work, a cam for alternately retracting the block and freeing the same when the welding pressure is to be applied and means for retarding the motion of the block as it moves forward.

9. In an electric metal-working apparatus the combination of a reciprocating block through which pressure is applied to the heated section of the work, a spring acting thereon to move it forward, a cam for alternately forcing the block backward and releasing it to the action of the spring and a counteracting-spring connected to the block for retarding the forward motion of the same.

10. In an electric welding apparatus the combination of a spring for applying pressure to the heated section of work, mechanism for releasing said spring to permit it to act and a counteracting-spring as and for the purpose described.

11. In an electric metal-working apparatus the combination with a spring-actuated work-holder, of means for applying a counteracting force when the work-holder moves forward to compress the heated section of work and a lever having an adjustable fulcrum for varying the counteracting force.

12. In an electric metal-working apparatus, the combination with a clamp-supporting block and a forging-tool, of an actuating mechanism therefor, a coupling for connecting the tool and actuating mechanism, a dog by which the members of the coupling are held disengaged and a controlling-lever for said dog normally restrained by the block.

13. In an electric metal-working apparatus, the combination with a clamp-supporting block, of a forging-tool, a spring-actuated rocking coupling key or pin, a dog normally holding the same out of action and means connected with the clamp-supporting block for releasing the dog and thereby coupling the forging-tool to the operating power when the block is permitted to move forward by the softening of the work.

14. In an electric metal-working apparatus, the combination with the work-holding carrier of an automatic lock for locking the same in its forward position during the forging of the heated work.

15. In an electric metal-working apparatus, the combination of a forging or shaping mechanism, a work-holding carrier, a lock for locking the same in its forward position during the shaping or forging, means connected with said lock for bringing the forging or shaping mechanism into operation when the carrier moves forward, and a controlling-lever connected with the releasing mechanism and normally restrained by engagement with the work-holding carrier.

16. In an electric metal-working apparatus, the combination of a work-holding slide, a tool-actuating shaft, a clutch coupling the same to a power-wheel, a dog normally engaging the clutch-operating arm and holding the same uncoupled, a catch controlling the position of said dog and an actuating mechanism for freeing said catch normally held out of action by the slide, but adapted to be released when the work softens and permits the slide to move forward.

17. In an electric metal-working apparatus, the combination with a work-holding slide and tool-actuating mechanism of a clutch connecting the same with a power mechanism, coupling devices normally tending to couple the tool-actuating mechanism and the power device, releasing mechanism for freeing the coupling devices, said releasing mechanism being normally restrained from action by the work-holding slide, but released thereby when the softening of the work permits the slide to move forward, and means connected with the tool-actuating mechanism for restoring said releasing mechanism to normal position.

18. In an electric metal-working apparatus, the combination with the tool-shaft of a coupler adapted to connect the same to the power device, a dog for normally holding said coupler in uncoupled position a work-holding slide, means controlled thereby for actuating the dog to free the coupler device, and means connected with the tool-shaft for restoring the dog to normal position.

19. In an electric metal-working apparatus, the combination with the tool-shaft of a coupler adapted to connect the same to the power device, a dog for normally holding said coupler in uncoupled position, means for applying pressure to an electrically-heated section of metal, means controlled thereby for actuating the dog to free the coupler device, and means connected with the tool-shaft for restoring the dog to normal position.

20. In an electric metal-working apparatus, the combination of a tool-actuating shaft or mechanism, a clutch-controlling arm, a dog normally restraining the same in uncoupling position, a work-holding slide, an arm normally sustained thereby but released when the slide moves forward, means controlled by said arm for governing the position of the dog to release the clutch-controlling arm, and means connected with the tool-actuating devices for restoring the dog to position for uncoupling the tool from the power.

21. In an electric metal-working apparatus, the combination of a work-holding slide, a master-shaft provided with a cam for controlling the application of pressure to the heated section of work, a clutch normally tending to disconnect said master-shaft from its power-shaft, a cam on the master-shaft for releasing the clutch and bringing the cam-shaft to rest, means connected to said master-shaft for starting the flow of heating-current in the work and means controlled through the yielding of the work under pressure for restarting said master-shaft and cutting off the flow of heating-current.

22. In an electric metal-working apparatus, the combination of a work-holding slide, means for applying pressure to the heated section of the work, a cam-shaft provided with a cam controlling the application of the pressure, means connected to said cam-shaft for starting the flow of heating-current in the work, means for automatically bringing the cam-shaft to rest as soon as pressure and heating-current are applied to the work, a forging apparatus normally quiescent, means controlled by the yielding of the work under pressure when brought to plastic condition for starting the forging apparatus, a clutch by which the cam-shaft is coupled to its power-shaft and means carried by the forging apparatus for actuating said clutch to bring its members into engagement and restarting the cam-shaft.

23. The combination, in an electric metal-working apparatus, of a work-holding slide, means for applying pressure thereto and through the same to the heated section of the work, a starting-switch for starting the flow of heating-current, a forging-tool, normally uncoupled from a suitable power, means for coupling the same automatically to the power when the slide moves forward through the softening of the work, a master-shaft normally coupled to such power and cams thereon acting respectively to start the flow of current, release the pressure devices, and automatically stop the master-shaft by uncoupling the power, and means controlled by the actuating devices of the die or forging-tool for automatically recoupling the cam-shaft to the power whereby the same may be restarted.

24. The combination, in an electric metal-working apparatus, of a work-holding slide, means for applying pressure thereto and through the same to the heated section of the work, a starting-switch for starting the flow of heating-current, a forging-tool normally uncoupled from a suitable power, means for coupling the same automatically to the power when the slide moves forward through the softening of the work, a master-shaft, a clutch by which the same is normally coupled to such power, a detent holding the clutch members in engagement, a cam on the master-shaft for releasing the detent, a cam on said shaft for starting the flow of heating-current and a cam on said shaft for controlling the application of pressure to the work.

25. In an electric metal-working apparatus, the combination of a spring-actuated work-holder, a forging-tool, a coupling device for coupling said forging-tool to a suitable power, means controlled by the work-holder for bringing the coupling device into operation, a circuit-controller governing the flow of heating-current in the work, a master-shaft, a clutch by which the same is normally connected to the driving power, means on said shaft for actuating or controlling the circuit-controller, means connected with said shaft for automatically uncoupling it from the driving power when the flow of heating-current has been established by the circuit-controller and means connected with the forging-tool for automatically recoupling said master-shaft with its operating parts.

26. In an electric metal-working apparatus, the combination of a work-holder, a forging-tool, mechanism controlled by the work-holder for bringing the forging-tool into operation when the work softens, a normally rotating master-shaft, means controlled thereby for starting the flow of heating-current, means for automatically stopping said master-shaft when the flow of heating-current is established, and means controlled by the forging-tool for restarting the master-shaft.

27. In an electric metal-working apparatus, the combination of a work-holder, a forging-tool, mechanism controlled by the work-holder for bringing the forging-tool into operation when the work softens, a normally rotating master-shaft, means controlled thereby for starting the flow of heating-current and clamping the work, means for automatically stopping said master-shaft when the flow of heating-current is established, and means controlled by the forging-tool for restarting the master-shaft.

28. In an electric metal-working apparatus, the combination of a work-holder, a forging-tool, mechanism controlled by the work-holder for bringing the forging-tool into operation when the work softens, a normally rotating master-shaft, means controlled thereby for starting the flow of heating-current, means carried by said shaft for automatically stopping the same after starting the flow, and means connected with the forging-tool for restarting the master-shaft so as to break the starting-circuit after the tool has done its work.

29. In an electric metal-working apparatus, the combination with a work-holding slide of a forging-tool, means for bringing the same into operation when the slide moves forward through the softening of the work, a master-shaft provided with means for automatically clamping the work and releasing the slide, means for automatically stopping said shaft in position to clamp the work and means controlled by the forging-tool for restarting the master-shaft.

30. In an electric metal-working apparatus, the combination of a master-shaft provided with means for controlling the flow of the heating-current, stop mechanism for automatically stopping said shaft, a tool-operating shaft, means controlled by the yielding of the heated section of work for starting said shaft and a cam thereon for resetting said stop mechanism in order to restart the master-shaft.

31. In an electric metal-working apparatus, the combination of a master-shaft provided with means for operating the clamp devices, stop mechanism for automatically stopping said shaft, a tool-operating shaft, means controlled by the yielding of the heated section of work for starting said shaft and a cam thereon for resetting said stop mechanism in order to restart the master-shaft.

32. In an electric metal-working apparatus, the combination with a master-shaft provided with means for controlling the flow of heating-current, of a clutch, a spring-actuated toggle for disconnecting the members of the clutch, a detent normally holding said spring out of action and means connected to said shaft for operating the detent when the shaft reaches position for establishing the flow of heating-current.

33. In an electric metal-working apparatus, the combination with a master-shaft provided with means for controlling the flow of heating-current, of a clutch, a spring-actuated toggle for disconnecting the members of the clutch, a detent normally holding said spring out of action, means connected to said shaft for operating the detent when the shaft reaches position for establishing the flow of heating-current and mechanism for automatically restoring the toggle to a position for rotating the shaft when the heated section of work yields to pressure.

34. In an electric metal-working apparatus, the combination with a master-shaft provided with means for controlling the flow of heating-current, of a clutch, a spring-actuated toggle for disconnecting the members of the clutch, a detent normally holding said spring out of action, means connected to said shaft for operating the detent when the shaft reaches position for establishing the flow of heating-current and mechanism controlled by the work-holding slide or carrier for restoring the toggle and clutch to position for rotating the shaft.

35. In an electric metal-working apparatus, the combination with a master-shaft provided with means for controlling the flow of heating-current, of a clutch, a spring-actuated toggle for disconnecting the members of the clutch, a detent normally holding said spring out of action, means connected to said shaft for operating the detent when the shaft reaches position for establishing the flow of heating-current, a forging-tool, means controlled by the yielding of the heated section of work for bringing the tool into operation and mechanism connected with the tool-operating devices for restoring the toggle and clutch to position for rotating the shaft.

36. The combination in an electric working apparatus of a work-holding carrier, an automatic lock for locking the same in its forward position, a forging-tool and actuating devices controlled by the carrier and means controlled by the operating mechanism of a forging-tool for unlocking the carrier.

37. The combination in an electric working apparatus of a power-actuated forging-tool, a work-holding carrier, means controlled thereby for coupling forging-tool to its actuating power, means for locking the carrier in the position to which it is permitted to move by the softening of the work and means connected with the forging-tool for unlocking said carrier.

38. In an electric metal-working apparatus, the combination of a master-shaft and circuit-controller actuated thereby, a spring-actuated clutch by which said shaft is normally coupled to the driving power, mechanism acting against said spring to throw the members of the clutch out of connection, detent devices normally holding said mechanism out of action, means connected with the shaft for actuating said detent devices and releasing said mechanism when the shaft reaches position for establishing the flow of heating-current and means controlled by the yielding of the heated section of work for returning the detent devices and the mechanism controlled thereby to normal position.

39. In an electric metal-working apparatus, the combination of a master-shaft and circuit-controller actuated thereby, a spring-actuated clutch by which said shaft is normally coupled to the driving power, mechanism acting against said spring to throw the members of the clutch out of connection, detent devices normally holding said mechanism out of action, means connected with the shaft for actuating said detent devices and releasing said mechanism when the shaft reaches position for establishing the flow of heating-current, a forging-tool controlled by the yielding of the heated section of work and means connected with said forging-tool for returning the detent devices and mechanism controlled thereby to position in which the shaft and the driving power are coupled.

40. In an electric metal-working apparatus, the combination with the master-shaft and means actuated thereby for controlling the flow of heating-current of a pair of coöperating power-controlling detents, means connected with shaft for operating one of said detents to bring the shaft to rest and means operated independently of the shaft for setting the other one of said detents in position for keeping the power temporarily in operation after the shaft resumes its rotation.

41. In an electric metal-working apparatus, the combination with the power-shaft and means controlled thereby for establishing the flow of heating-current, of a detent actuated by the shaft, mechanism controlled by said detent for stopping the rotation thereof, means for restoring said mechanism to position for restarting the shaft and a second temporarily-acting detent for holding said mechanism in position after the shaft resumes rotation.

42. In an electric metal-working apparatus, the combination with the power-shaft and means controlled thereby for establishing the flow of heating-current, of a detent actuated by the shaft mechanism controlled by said detent for stopping the rotation thereof, means for restoring said mechanism to position for restarting the shaft, a second temporarily-acting detent for holding said mechanism in position after the shaft resumes rotation, and means connected with the shaft for releasing the latter detent and thereby delivering the control of the starting and stopping mechanism to the first-named detent thereby preparing the apparatus for a repetition of the automatic stopping arrangement.

43. In an electric metal-working apparatus, the combination with a master-shaft of mechanism for stopping and starting the rotation thereof, a pair of spring-actuated detents for holding said mechanism in position to produce rotation, means on the shaft acting on one of said detents to release the mechanism and stop rotation of the shaft and upon the other detent to deliver the mechanism to the control of the first-named detent.

44. In an electric metal-working apparatus, the combination with the master-shaft and the power-controlling mechanism by which the same is rotated, of a pair of detents 128 and 128' of different lengths, a dog connected to the controlling mechanism and adapted to engage either of said detents and means connected with the shaft for acting on said detents at different stages of the revolution of said shaft.

45. In an electric metal-working apparatus, the combination with the master-shaft of the spring-actuated detents 128, 128' of different lengths, a dog 127 detained thereby and connected with mechanism for starting and stopping rotation of the shaft, a cam carried by said shaft and acting on said detents, means controlled by the shaft for starting the flow of heating-current and means responsive to the yielding of the work when rendered plastic by the heating for returning the dog 127, from position assumed when it has been freed by both detents.

46. The combination with an electric metal working apparatus of a current-controller having two members which coact to close the circuit, a cam for holding one of said members in circuit-closing position while heating-current is required, a latch or catch for holding the other member in circuit-closing position and mechanism for depressing said member and throwing it into circuit-closing position in the interval between the periods of use of the heating-current.

47. In an electric metal-working apparatus a current-controller having two members which coact to close the circuit, a latch for holding one member in closed position, a cam acting momentarily on said member to throw it into circuit-closing position and a second cam for holding the other member in circuit-closing position.

48. In an electric metal-working apparatus, a current-controller having two members which coact to close the circuit, a latch for holding one member in closed position, a cam acting momentarily on said member to throw it into circuit-closing position, a second cam for holding the other member in circuit-closing position during the time that the heating-current is required and means for acting on said latch to free the member held thereby in order to stop the flow of current.

49. In an electric metal-working apparatus, a current-controller having two members which coact to close the circuit, a latch for holding one member in closed position, a cam acting momentarily on said member to throw it into circuit-closing position, a second cam for holding the other member in circuit-closing position during the time that the heating-current is required, mechanism for forging or shaping the heated section of work and means connected therewith for operating on said latch to free the member locked thereby and thereby stop the flow of heating-current.

50. In an electric metal-working apparatus, the combination with a circuit-controller, having two members which coact to cause a flow of heating-current in the work, a camshaft having two cams operating respectively on said members to place them in operative position and acting consecutively and means for stopping the cam-shaft in position where one of said members will be held by its cam, the other member being at such time free from the cam by which it has been set.

51. In an electric metal-working apparatus, the combination with a circuit-controller, having two members which coact to cause a flow of heating-current in the work, a cam-shaft having two cams operating respectively on said members to place them in operative position and acting consecutively, means for stopping the cam-shaft in position where one of said members will be held by its cam, the other member being at such time free from the cam by which it has been set, a latch for holding the latter member down and means for operating the latch to free the member so as to open the circuit and stop the flow of heating-current.

52. The combination with a circuit-controller having two members independently operated but which coact to close the circuit, a cam acting temporarily on one of said members to throw the same, a latch for holding said member when thrown, a second cam for acting on the second member and means for temporarily stopping the cams in position where the latter cam will hold the member upon which it acts and the first-named cam will be free from the member on which it acts.

53. In an electric metal-working apparatus, the combination with a current-controller having two members which coact to close the circuit, of a master-shaft provided with means for holding one of said members in circuit-closing position when said shaft is brought to rest, a latch for holding the other member in circuit-closing position and mechanism controlled by the yielding of the heated section of work for automatically releasing the same.

54. In an electric metal-working apparatus, the combination of a master-shaft, a compound circuit-controller, means for automatically bringing said shaft to rest in position to hold one member of said circuit-controller in position for establishing the flow of heating-current, independent means for holding the other member in coöperating position and means for automatically releasing the latter member when the section of electrically-heated work yields to pressure.

55. In an electric metal-working apparatus, the combination with a compound circuit-closer of an actuating-shaft, a latch for holding one of the members of said circuit-closer in closed position, a forging-tool and mechanism controlled thereby for releasing said member.

56. In an electric metal-working apparatus, the combination with a compound circuit-closer, of an actuating-shaft, a latch for holding one of the members of said circuit-closer in closed position, a work-holding carrier and mechanism controlled thereby for releasing said member.

57. In an electric metal-working apparatus, the combination with a compound circuit-closer, of an actuating-shaft, a latch for holding one of the members of said circuit-closer in closed position, a forging-tool, mechanism for automatically bringing the forging-tool into operation when the heated work yields to pressure and means connected with the forging-tool for releasing said member.

58. In an electric metal-working apparatus, the combination of a circuit-controller having two members which coact to start a flow of heating-current in the work, a master-shaft provided with means for placing said members in operative position, a latch for holding one of said members, means for automatically bringing the shaft to rest in position to hold the other member, and mechanism for automatically releasing the latched member when the heated section of work yields to pressure.

59. In an electric metal-working apparatus, the combination of a circuit-controller having two members which coact to start the flow of heating-current in the work, a master-shaft provided with means for placing said members in operative position, a latch for holding one of said members, means for automatically bringing the shaft to rest in position to hold the other member, a forging-tool and means connected therewith for releasing the latched member.

60. In an electric metal-working apparatus, the combination of a circuit-controller having two members which coact to start the flow of heating-current in the work, a master-shaft provided with means for placing said members in operative position, a latch for holding one of said members, means for automatically bringing the shaft to rest in position to hold the other member, a forging-tool mechanism for automatically bringing the same into action when the section of heated work yields under pressure and means connected with said forging-tool for releasing the latched member.

61. In an electric metal-working apparatus, the combination of a master-shaft, a movable work-holder provided with clamping devices, means upon the master-shaft for operating said clamping devices, a compound circuit-controller for establishing and disestablishing the flow of heating-current in the work, means upon the master-shaft for setting the members of said circuit-controller in operating position consecutively, means for automatically bringing the shaft to rest in position where it acts on one of said members, a latch for holding the other member in operative position and mechanism controlled by the work-holder for unlatching the latter member to disestablish the flow of heating-current.

62. In an electric metal-working apparatus, the combination of a master-shaft, a movable work-holder provided with clamping devices, means upon the master-shaft for operating said clamping devices, a compound circuit-controller for establishing and disestablishing the flow of heating-current in the work, means upon the master-shaft for setting the members of said circuit-controller in operating position consecutively, means for automatically bringing the shaft to rest in position where it acts on one of said members, a latch for holding the other member in operative position, a forging-tool, mechanism controlled by the work-holder for bringing the forging-tool into operation and devices connected with the forging-tool for unlatching the latter member.

63. In an electric metal-working apparatus, the combination of a current-controller having two coacting members, means acting momentarily on one of said members to set it in circuit-closing position, a latch for maintaining it in such position, a rotating shaft provided with means for holding the other member in circuit-closing position, mechanism for automatically bringing said shaft to rest and mechanism controlled by the yielding of the heated section of work for releasing the latch.

64. In an electric metal-working apparatus, the combination of a compound circuit-controller for establishing and disestablishing the flow of heating-current, a master-shaft having cams which act on the two members of the circuit-controller in succession, a latch for one of said members, a tool-operating shaft, means connected therewith for releasing said latch, means for automatically bringing the shaft to rest, and means for automatically restarting said shaft when the heated section of work yields under pressure.

65. In an electric metal-working apparatus, a compound circuit-controller having two members, in combination with means for setting one of said members in circuit-closing position in the intervals between the periods of use of heating-current, mechanism for setting the other member into coacting position to establish the flow of heating-current, a forging-tool and means connected therewith for automatically unsetting the first-named member to disestablish the flow of heating-current.

66. In an electric metal-working apparatus, a compound circuit-controller having two members, a master-shaft, means on said shaft for setting one of said members in operating position, means connected with said shaft for setting the other member into coacting position to establish the flow of heating-current and mechanism controlled by the yielding heated section of work for unsetting the first-named member to disestablish the flow of heating-current.

Signed at Lynn, in the county of Essex and State of Massachusetts, this 19th day of October, A. D. 1904.

ADOLPH F. RIETZEL.
GEORGE E. BARSTOW.

Witnesses:
GEO. W. N. CHADWELL,
E. W. HAWES.